June 7, 1955  T. E. BUBENZER  2,709,987
REVOLVING FEED TROUGH
Filed June 1, 1953
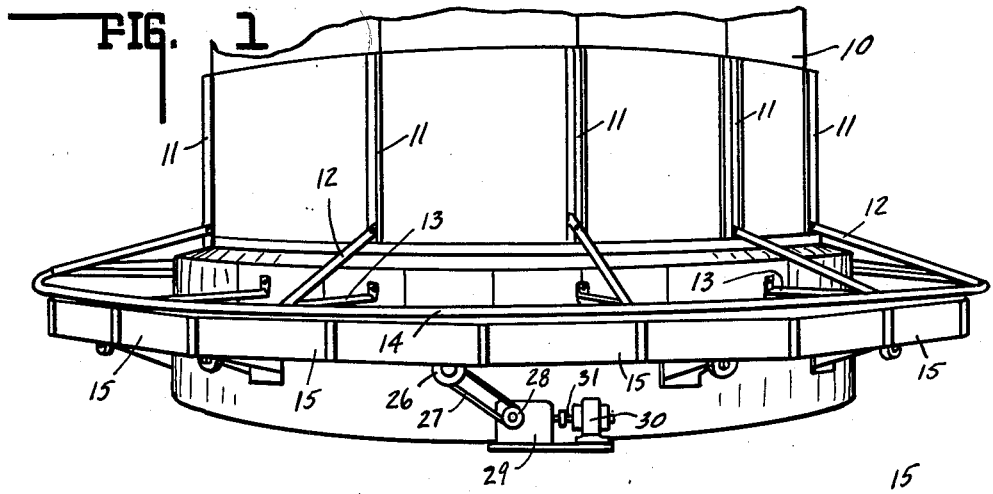
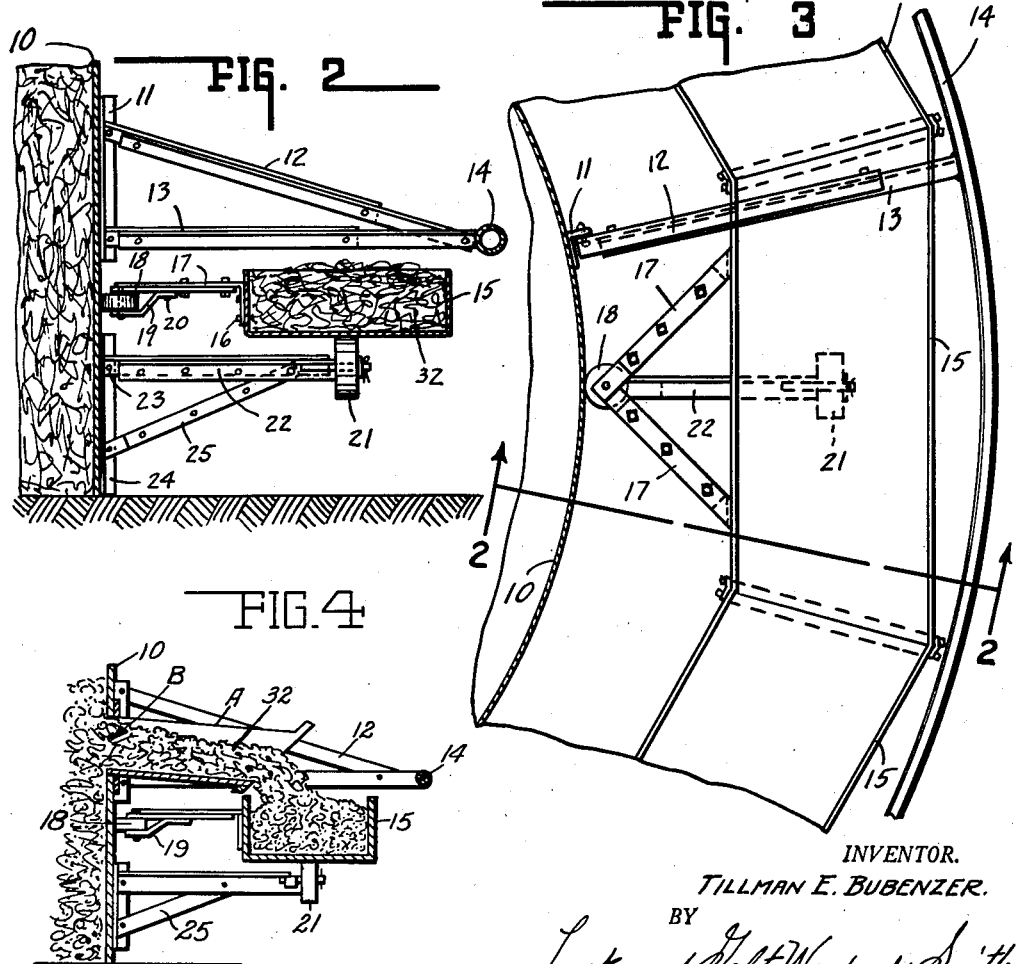
INVENTOR.
TILLMAN E. BUBENZER.
BY
Lockwood, Galt, Woodard & Smith,
ATTORNEYS.

2,709,987

REVOLVING FEED TROUGH

Tillman E. Bubenzer, Noblesville, Ind.

Application June 1, 1953, Serial No. 358,590

7 Claims. (Cl. 119—52)

This invention relates to a revolving feed trough for use with cylindrical containers such as silos, storage pins or the like.

Heretofore a considerable amount of work has been involved in the feeding of livestock from cylindrical ensilage containers such for example as silos. This has been true even where automatic unloading devices have been employed. In an effort to reduce the amount of labor required, additional unloading chutes or sprouts have been employed, but since these necessitate considerable additional expense, they have not constituted a practical and economical solution to the problem. It is the primary object of the present invention to provide a feed trough which will appreciably reduce the amount of labor heretofore required as aforesaid, and as well will substantially reduce the expense through the elimination of all but one of the unloading devices.

It is a further object of the present invention to provide a feed trough of such construction that it can readily be assembled and put into use by a farmer himself without expert or technical assistance.

It is a still further object of the present invention to provide a feed trough of such character that it will utilize space efficiently and yet feed a maximum number of cattle or other livestock.

It is a still further object of the present invention to provide a feed trough of such character that the ensilage, grain or other livestock feeds from the silo may be distributed thereon in an even manner and to the extent desired.

The full nature of the invention will be understood from the accompanying drawings and the following description and claims:

In the drawings Fig. 1 is a side elevation view of the lower portion of a silo with the invention shown mounted thereabout.

Fig. 2 is a view taken on lines 2—2 of Fig. 3 in the direction of the arrows.

Fig. 3 is an enlarged top plan view of a quadrant or sector of the feed trough and its mountings, and Fig. 4 is a view similar to Fig. 2 and illustrating a conventional discharge opening in the silo wall through which the silage is delivered to the trough.

In the drawings a lower portion of a silo is shown at 10, it containing the ensilage or fodder which is to be fed to the livestock. Only one unloading or discharge chute or spout is needed by reason of the character and construction of the device involving my invention. A conventional spout A is shown in Fig. 4 attached at its inner end to the wall of the silo 10 near its bottom and in communication with an opening B in said wall whereby the contents of the silo may flow out to a trough to be later described.

Connected to vertically extending angles 11 are the downwardly inclined bracing struts 12 which along with the substantially horizontal struts 13 support a circular guard rail 14. This rail is mounted slightly above and outwardly from the circular feed trough hereinafter described and serves the purpose of keeping cattle or other feeding stock the desired distance from the trough so as to avoid damage to it.

The trough itself comprises a plurality of connected sections 15 which are U-shaped in cross section as shown particularly in Fig. 2. Secured to the inner side wall of each section of the trough by the bolts 16 or any other suitable means are the converging arms 17 which at their point of juncture mount a centering wheel 18. This wheel is preferably but not necessarily of rubber or other resilient material. It is pivotally mounted between the juncture of the arms 17 and an auxiliary arm 19 which is bolted or otherwise secured to the arms 17 by the bolts 20. There will be approximately as many centering wheels as there are trough sections, and these wheels in the aggregate serve to center the trough upon the support wheels 21 which are also preferably but not necessarily of rubber or any other resilient material.

A plurality of such support wheels is provided. Each is rotatably mounted upon the substantially horizontal arm 22 which are suitably secured as at 23 to a vertical angle 24 which is connected to the outer wall of the silo. A bracing strut 25 is suitably connected both to the angle end to the arm 22. As shown particularly in Fig. 2, the support wheel engages the bottom of the trough.

One of the arms 22 mounts dual wheels as indicated at 26 to increase the surface that touches the underside of the trough. These wheels are connected by a chain 27 with a driving gear 28 connected in turn with a gear reduction box 29. An electric motor is shown at 30 which is connected by the shaft 31 to the gear reduction box.

In operation, at the same time the automatic unloading device is actuated the electric motor is also started. This results in a feeding of the ensilage or fodder 32 through discharge chute A onto the trough. The rotation of the drive wheels 26 which are in frictional engagement with the under surface of the trough causes the trough to rotate. This rotation is facilitated by the provision of the support wheels 21 which act to reduce the friction of the moving trough to a minimum. By permitting the trough to rotate at a constant speed, the ensilage from the silo is distributed evenly in the entire trough. When the trough is filled to the desired level the operator merely shuts off the automatic unloading device as well as the electric motor driving the wheels 26. At such time the cattle or other livestock may be fed. Of course, it is possible, if desired, to feed the cattle from the trough as it is rotating.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

The invention claimed is:

1. In combination with a feed container having a discharge opening; a feed supporting mechanism comprising a rotatable feed trough concentric with said container and disposed in spaced relation from its walls adjacent said opening to receive feed discharged through the latter, a plurality of rotatable elements connected to said container and engaged with said trough for support thereof, said elements being arcuately spaced, and driving means operably associated with said trough for rotating it about said container upon said elements.

2. In combination with a feed container having a discharge opening; a feed supporting mechanism comprising a trough mounted in spaced relation from the walls of said container adjacent said opening, a plurality of rotating means connected to said trough and extending inwardly into engagement with the walls of said container for spacing said trough in its rotation thereabout, a plurality of rotating elements supported by said container and engageable with the bottom of said trough for supporting the trough, and driving means in engagement with said trough for rotation thereof.

3. A rotary feed supporting mechanism comprising a substantially circular member, a revolvable feed trough concentric with said member and disposed in spaced relation from its walls, a plurality of rotatable elements supported by said member and engageable with the bottom of said trough for support thereof, driving means operably associated with said trough for revolving it relative to said member, means for centering said trough upon said elements, said centering means comprising a plurality of annularly spaced rotatable elements connected to said trough and extending into engagement with the wall of said member.

4. In a feeding device, the combination with an upright cylindrical feed container having a discharge opening in a wall thereof, an annular trough encircling and spaced from said container to receive feed discharged through said opening, bearings underlying and supporting said trough, arms secured at their outer ends to said trough and extending inwardly therefrom, bearing rollers at the inner ends of said arms engaged with the wall of said container, and means operatively connected with said trough for rotating the same.

5. In a feeding device, the combination with an upright cylindrical feed container having a discharge opening in a wall thereof, an annular trough concentric with said container and spaced outwardly from the walls thereof to receive material discharged through said opening, means for rotatably supporting said trough, arms connected at their outer ends to said trough and projecting radially therefrom toward said container, bearing members on the inner ends of said arms engaged with the wall of said container, and means operatively connected with said trough for rotating the same.

6. In a feeding device, the combination with an upright cylindrical feed container having a discharge opening in a wall thereof, an annular trough encircling and spaced from said container to receive feed discharged through said opening, anti-friction rollers interposed between said wall and said trough, means for supporting said trough, and means operatively connected to said trough for rotating the same.

7. In a feeding device, the combination with an upright cylindrical feed container having a discharge opening in a wall thereof, an annular rotatable trough encircling and spaced from said container to receive feed discharged through said opening, arms arranged in spaced relationship and radially between said container and said trough, bearings supported by said arms to provide anti-friction means between said wall and said trough, and means operatively connected to said trough for rotating the same.

References Cited in the file of this patent

UNITED STATES PATENTS

| 1,375,961 | Hart | Apr. 26, 1921 |
| 1,385,281 | Smiley | July 19, 1921 |
| 1,543,525 | Shiras | June 23, 1925 |
| 2,638,871 | Ruedemann | May 19, 1953 |

FOREIGN PATENTS

| 453,262 | France | Mar. 31, 1913 |